(12) United States Patent
Moriya et al.

(10) Patent No.: US 11,926,338 B2
(45) Date of Patent: Mar. 12, 2024

(54) VEHICLE CONTROL APPARATUS

(71) Applicant: SUBARU CORPORATION, Tokyo (JP)

(72) Inventors: Fumiyuki Moriya, Tokyo (JP); Hirofumi Yabe, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 167 days.

(21) Appl. No.: 17/235,594

(22) Filed: Apr. 20, 2021

(65) Prior Publication Data
US 2021/0331694 A1 Oct. 28, 2021

(30) Foreign Application Priority Data
Apr. 23, 2020 (JP) .................... 2020-076647

(51) Int. Cl.
| | | |
|---|---|---|
| *B60W 60/00* | (2020.01) | |
| *B60W 20/20* | (2016.01) | |
| *B60W 20/40* | (2016.01) | |
| *B60W 30/18* | (2012.01) | |
| *B60W 30/182* | (2020.01) | |

(52) U.S. Cl.
CPC .......... *B60W 60/001* (2020.02); *B60W 20/20* (2013.01); *B60W 20/40* (2013.01); *B60W 30/18109* (2013.01); *B60W 30/182* (2013.01)

(58) Field of Classification Search
CPC .... B60W 60/001; B60W 20/20; B60W 20/40; B60W 30/18109; B60W 30/182; B60W 10/06; B60W 10/08; B60W 10/18; B60W 10/30; B60W 20/15; B60W 30/18018; B60W 30/181; B60W 2540/221; Y02T 10/62; B60K 28/06

USPC .......................................................... 701/23
See application file for complete search history.

(56) References Cited

U.S. PATENT DOCUMENTS

| | | | |
|---|---|---|---|
| 2013/0297193 A1 | 11/2013 | Morisaki | |
| 2018/0370431 A1* | 12/2018 | Wincek | B60H 1/00757 |
| 2020/0398640 A1* | 12/2020 | Chang | B60H 1/00792 |

FOREIGN PATENT DOCUMENTS

| | | |
|---|---|---|
| JP | 2001-224105 A | 8/2001 |
| JP | 2010-39633 A | 2/2010 |
| JP | 2017-177932 A | 10/2017 |

(Continued)

OTHER PUBLICATIONS

Notice of Reasons for Refusal issued in Japanese Patent Application No. 2020-076647 dated Nov. 28, 2023, with machine translation.

*Primary Examiner* — Scott A Reinbold
(74) *Attorney, Agent, or Firm* — TROUTMAN PEPPER HAMILTON SANDERS LLP (57) ABSTRACT

A vehicle control apparatus includes an automatic-driving processor and an engine processor. The automatic-driving processor is configured to perform an automatic-driving control to stop a vehicle in accordance with detection of an abnormal state of a driver who drives the vehicle while the vehicle is traveling. When the vehicle is in a standby state after stopping of the vehicle by the automatic-driving control, the engine processor is configured to perform an engine driving control to reduce how frequently an engine of the vehicle is started, compared with when the vehicle is in a normal traveling state. The standby state is a state in which an operation control of an air conditioner of the vehicle is allowed.

10 Claims, 6 Drawing Sheets

| | | TARGET TEMPERATURE | | |
|---|---|---|---|---|
| | | LOW | MEDIUM | HIGH |
| CURRENT TEMPE-RATURE | LOW | ELECTRIC POWER GENERATION AMOUNT (MEDIUM) | ELECTRIC POWER GENERATION AMOUNT (MEDIUM) | ELECTRIC POWER GENERATION AMOUNT (LARGE) |
| | MEDIUM | ELECTRIC POWER GENERATION AMOUNT (MEDIUM) | ELECTRIC POWER GENERATION AMOUNT (SMALL) | ELECTRIC POWER GENERATION AMOUNT (MEDIUM) |
| | HIGH | ELECTRIC POWER GENERATION AMOUNT (LARGE) | ELECTRIC POWER GENERATION AMOUNT (MEDIUM) | ELECTRIC POWER GENERATION AMOUNT (MEDIUM) |

(56) References Cited

FOREIGN PATENT DOCUMENTS

JP      2017177932 A  * 10/2017
WO   2012/098658 A1    7/2012

* cited by examiner

|  | | TARGET TEMPERATURE | | |
|---|---|---|---|---|
|  | | LOW | MEDIUM | HIGH |
| CURRENT TEMPERATURE | LOW | ELECTRIC POWER GENERATION AMOUNT (MEDIUM) | ELECTRIC POWER GENERATION AMOUNT (MEDIUM) | ELECTRIC POWER GENERATION AMOUNT (LARGE) |
| | MEDIUM | ELECTRIC POWER GENERATION AMOUNT (MEDIUM) | ELECTRIC POWER GENERATION AMOUNT (SMALL) | ELECTRIC POWER GENERATION AMOUNT (MEDIUM) |
| | HIGH | ELECTRIC POWER GENERATION AMOUNT (LARGE) | ELECTRIC POWER GENERATION AMOUNT (MEDIUM) | ELECTRIC POWER GENERATION AMOUNT (MEDIUM) |

VEHICLE CONTROL APPARATUS

CROSS-REFERENCE TO RELATED APPLICATIONS

The present application claims priority from Japanese Patent Application No. 2020-076647 filed on Apr. 23, 2020, the entire contents of which are hereby incorporated by reference.

BACKGROUND

The technology relates to a vehicle control apparatus for a vehicle that includes an engine as a power source.

A technique is known that stops, upon detection of abnormality such as loss of consciousness of a driver, a traveling vehicle by an automatic-driving control to thereby allow for prevention of a subsequent accident, for example.

Japanese Unexamined Patent Application Publication No. 2017-177932 discloses a technique of determining whether a driver is able to drive a vehicle on the basis of a detected state of the driver, and upon determining that the driver is unable to drive the vehicle, stopping the vehicle by an automatic-driving control.

SUMMARY

An aspect of the technology provides a vehicle control apparatus that includes an automatic-driving processor and an engine processor. The automatic-driving processor is configured to perform an automatic-driving control to stop a vehicle in accordance with detection of an abnormal state of a driver who drives the vehicle while the vehicle is traveling. When the vehicle is in a standby state after stopping of the vehicle by the automatic-driving control, the engine processor is configured to perform an engine driving control to reduce how frequently an engine of the vehicle is started, compared with when the vehicle in a case where the vehicle is in a normal traveling state. The standby state is a state in which an operation control of an air conditioner of the vehicle is allowed.

An aspect of the technology provides a vehicle control apparatus that includes circuitry. The circuitry is configured to perform an automatic-driving control to stop a vehicle in accordance with detection of an abnormal state of a driver who drives the vehicle while the vehicle is traveling. When the vehicle is in a standby state after stopping of the vehicle by the automatic-driving control, the circuitry is configured to perform an engine driving control to reduce how frequently an engine of the vehicle is started, compared with when the vehicle is in a normal traveling state. The standby state is a state in which an operation control of an air conditioner of the vehicle is allowed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

For example, stopping a vehicle with an unconscious driver in an environment such as a heavy snow environment can lead to a second disaster such as hypothermia of an occupant such as the driver due to a decrease in vehicle inside temperature. Accordingly, it may be desired to continue an operation control of an air conditioner in the vehicle in accordance with a factor such as a vehicle inside temperature and a state of the driver also after the vehicle is stopped by an automatic-driving control.

However, in a case where engine driving is performed also after the stopping of the vehicle in a state where the operation control of the air conditioner is allowed and where the vehicle is stopped, for example, in an environment where the vehicle is covered with accumulated snow, the snow may block an exhaust outlet of the vehicle, causing an exhaust gas to flow back inside the vehicle. This may possibly cause a second disaster such as carbon monoxide poisoning of an occupant such as the driver.

For such a reason, it may be desired to reduce occasions of engine driving to the minimum after the stopping of the vehicle by the automatic-driving control. The engine driving may be performed, for example but not limited to, in order to charge a battery used for operation of the air conditioner.

It is desirable to provide a vehicle control apparatus that makes it possible to minimize engine driving for operation of an air conditioner after stopping of a vehicle by an automatic-driving control.

Some example embodiments of the technology are described below with reference to FIGS. 1 to 6. Note that the following description is directed to illustrative examples of the disclosure and not to be construed as limiting to the technology. Each configuration illustrated in the drawings referred to in the following description is partial extraction of a configuration of the example embodiment, and is modifiable in a variety of ways in accordance with a design or any other factor as long as the modification does not derive from the technical idea of the technology. Further, elements in the following example embodiments which are not recited in a most-generic independent claim of the disclosure are optional and may be provided on an as-needed basis.

Configurations once described may be denoted with the same numerals to avoid any redundant description. Moreover, embodiments of the technology are not limited to those described below and encompass modifications, alternations, etc. in a range that allows for achievement of what may be desired by the embodiments of the technology.

A description is given below of an example of a configuration of a vehicle control apparatus 1 according to an example embodiment of the technology with reference to FIG. 1.

The vehicle control apparatus 1 may be provided, for example, in a hybrid electric vehicle that includes an engine and a motor generator (MG) as power sources for driving wheels.

The vehicle control apparatus 1 may include an engine control unit 2, a motor control unit 3, a hybrid control unit 4, a brake control unit 5, a display control unit 6, a communication control unit 7, an air-conditioning control unit 8, and a driving-assist control unit 9. These control units may each include a microcomputer including, for example, a central processing unit (CPU), a read-only memory (ROM), and a random-access memory (RAM). The control units may be coupled to each other via a bus wiring to perform mutual communication.

The engine control unit 2 may perform various engine driving controls for the engine of the vehicle including, without limitation, a fuel injection control, an ignition control, and a suction-air amount adjustment control. Coupled to the engine control unit 2 may be various sensors related to an engine control including, without limitation: a vehicle-speed sensor 21 that detects a traveling speed of the vehicle as a vehicle speed; an engine-speed sensor 22 that detects a speed of the engine; an accelerator-position sensor 23 that detects an amount of depression of an accelerator pedal as an accelerator position; and a throttle-angle sensor 24 that detects an angle of a throttle valve as a throttle angle. The engine control unit 2 may use detected values of these sensors to perform the engine driving controls.

The motor control unit 3 may control a motor driving unit 31 on the basis of required motor driving force instructed from the hybrid control unit 4, to thereby perform an operation control of an MG 32. The motor driving unit 31 may be configured as an electric circuit unit including a driving circuit for the MG 32.

In a case of causing the MG 32 to perform power running on the basis of the required motor driving force, the motor control unit 3 may give an instruction to the motor driving unit 31 to thereby cause the MG 32 to perform power running. In a case of causing the MG 32 to perform regeneration on the basis of the required motor driving force, the motor control unit 3 may give an instruction to the motor driving unit 31 to thereby cause the MG 32 to perform regeneration.

Here, the vehicle control apparatus 1 may include an unillustrated high-voltage battery as a power source of the MG 32. The high-voltage battery may be charged on the basis of electric power generated by the regeneration of the MG 32.

The hybrid control unit 4 may give instructions to the engine control unit 2 and the motor control unit 3 on the basis of: required driving force based on an accelerator operation amount based on an accelerator position value received from the engine control unit 2; or required driving force calculated by the driving-assist control unit 9. The hybrid control unit 4 may thereby control operation of the vehicle.

The hybrid electric vehicle may have operation control modes including an EV control mode and an HEV control mode. The hybrid control unit 4 may switch the operation control mode between the EV control mode and the HEV control mode in accordance with an instruction given from the driving-assist control unit 9.

The EV control mode may be a mode in which the vehicle travels with use of power supplied from the motor while the engine is stopped. In the EV control mode, the hybrid control unit 4 may calculate driving force required for the motor on the basis of the inputted required driving force. Further, the hybrid control unit 4 may give an instruction related to the calculated required driving force to the motor control unit 3, thereby controlling the operation of the motor.

The HEV control mode may be a mode in which the vehicle is allowed to travel with use of both the power from the engine and the power from the motor. In the HEV control mode, the hybrid control unit 4 may calculate driving force Tx required for the engine and driving force Ty required for the motor on the basis of the inputted required driving force. The hybrid control unit 4 may give an instruction related to the calculated required driving force Tx to the engine control unit 2, thereby controlling the operation of the engine. The hybrid control unit 4 may give an instruction related to the calculated required driving force Ty to the motor control unit 3, thereby controlling the operation of the motor.

In one example embodiment, in the HEV control mode, the hybrid control unit 4 may calculate the required driving force Tx and give the instruction related to the calculated required driving force Tx to the engine control unit 2, thereby controlling only the operation of the engine.

Further, in the HEV control mode, the hybrid control unit 4 may cause the motor control unit 3 to execute a control of charging the high-voltage battery on the basis of a state of charge (SOC) value of the high-voltage battery.

The brake control unit 5 may control various actuators, which are each provided as a brake-related actuator 51, on the basis of, for example, a detection signal from a predetermined sensor or data of an operation input performed by an occupant such as a driver. Non-limiting examples of the brake-related actuator 51 may include a hydraulic control actuator adapted to control, for example, an output hydraulic pressure from a brake booster to a master cylinder or a hydraulic pressure in a brake fluid pipe. The brake control unit 5 may also perform, for example, an automatic brake control for avoiding contact with another object in accordance with an instruction given from the driving-assist control unit 9.

The display control unit 6 may perform a display control for various display units 61 provided in a part such as a meter panel of the vehicle. Non-limiting examples of the display units 61 may include: a multifunction display (MFD); various meters including, without limitation, a speedometer and a tachometer provided in the meter panel; and any other display device adapted to display information for the occupant such as the driver.

The display control unit 6 may also be configured to perform a control to cause the display unit 61 to perform warning display in accordance with an instruction given from the driving-assist control unit 9, for example, in a case where the driver is estimated to be in an abnormal state.

The abnormal state of the driver may refer to, for example but not limited to, a state in which it is highly possible that the driver is unable to perform driving operation. Non-limiting examples of such a state may include: an unconscious state of the driver due to a cause such as an acute disease or a faint; a non-concentrating state of the driver in which the driver is not able to concentrate on driving due to drowsing or looking into another direction; and a driver absent state in which the driver is absent inside the vehicle due to a cause such as an accident.

The display control unit 6 may also perform a control of audio output, such as navigation audio, of an audio output unit 62 provided in the vehicle. The audio output unit 62 may include, for example but not limited to, a sound source, an audio signal processor, and a speaker.

The display control unit 6 may be configured to so perform a control that the audio output unit 62 outputs a warning sound in accordance with a control signal supplied from the driving-assist control unit 9, for example, in a case where the driver is estimated to be in the abnormal state.

The communication control unit 7 may be configured to perform communication with an external apparatus that is provided outside the vehicle. The communication control unit 7 may include an antenna, and may be configured to perform wireless communication with the external apparatus via the antenna.

The air-conditioning control unit 8 may execute a control related to air conditioning, for example, cooling and heating of inside of a vehicle compartment, ventilating, and defrosting. The air-conditioning control unit 8 may execute an operation control of the air conditioner in accordance with, for example, input operation performed by an occupant such as the driver or an instruction given from the driving-assist control unit 9.

The driving-assist control unit 9 may perform various driving-assist controls including, without limitation, an automatic-cruise control and a steering-assist control with use of a detected value of a vehicle outside environment sensor 91.

The vehicle outside environment sensor 91 may comprehensively refer to sensors including, without limitation, a vehicle outside imaging sensor, an outside temperature sensor, and a global positioning system (GPS) sensor. The vehicle outside imaging sensor may be, for example, an imaging device adapted to detect: an object that is present outside the vehicle, such as a preceding vehicle, a pedestrian, or a lane; weather outside the vehicle, such as sunny weather, rainy weather, or snowy weather; or a situation outside the vehicle such as submersion or snow accumulation. The outside temperature sensor may detect a temperature outside the vehicle. The GPS sensor may measure positions on the basis of latitude, longitude, and altitude.

Note that the sensor used to detect an object is not limited to the imaging device, and may be any other sensor such as a milliwave radar.

The driving-assist control unit 9 may control each unit to be used for the driving-assist control for operation such as acceleration, braking, or steering, on the basis of data such as data of an object detected on the basis of a detected value of the vehicle outside imaging sensor of the vehicle outside environment sensor 91, for example.

The driving-assist control unit 9 may also detect an abnormal state of the driver while the vehicle is traveling.

The driving-assist control unit 9 may use, for example, a detected value of a vehicle inside environment sensor 92 to detect the abnormal state of the driver.

The vehicle inside environment sensor 92 may comprehensively refer to sensors including, without limitation: a pulse sensor that detects a pulse of the driver; a body temperature sensor that detects a body temperature of the driver; a vehicle inside temperature sensor that detects a temperature inside the vehicle; a vehicle inside imaging sensor such as an imaging device that detects expression or an attitude of the driver; an on-vehicle microphone that acquires audio data of the driver or any other audio data; and a steering angle sensor that detects a steering angle to determine abnormality in steering operation.

Upon detecting the abnormal state of the driver on the basis of data such as a detected value of any of the various sensors of the vehicle inside environment sensor 92, the driving-assist control unit 9 may perform the automatic-driving control of stopping the traveling vehicle.

Further, the driving-assist control unit 9 may cause the air-conditioning control unit 8 to execute the operation control of the air conditioner in accordance with, for example but not limited to, the vehicle inside temperature and the body temperature of the driver in a period up to the stopping of the vehicle by the automatic-driving control and after the stopping of the vehicle.

After the stopping of the vehicle by the automatic-driving control, the driving-assist control unit 9 may perform communication with an external apparatus on an operator side via the communication control unit 7. For example, the operator may make arrangements for an emergency vehicle. The driving-assist control unit 9 may thus transmit, to the external apparatus, for example, a request for making arrangements for an emergency vehicle and position data of the vehicle acquired from the GPS sensor.

Further, the driving-assist control unit 9 may set the operation control mode of the hybrid control unit 4 to the EV control mode or the HEV control mode in accordance with a satisfaction state of a predetermined condition. The driving-assist control unit 9 may cause the hybrid control unit 4 to execute an operation control of the engine, the motor, or both on the basis of the set operation control mode. The predetermined condition may refer to a condition for determining that engine driving is required. Non-limiting examples of such a predetermined condition may include: an air-conditioning condition such as operation of the air conditioner; a charge rate (an SOC value) of the high-voltage battery; a traveling system condition such as an oil temperature of a transmission of a continuously variable transmission (CVT) or an engine water temperature.

Upon determining that the engine driving is required on the basis of the satisfaction state of the predetermined condition, the driving-assist control unit 9 may set the operation control mode to the HEV control mode, and cause the hybrid control unit 4 to execute a predetermined operation control such as a control of traveling based on the engine or a charging control of the high-voltage battery.

A description is given below of examples of processes to be executed by the vehicle control apparatus 1 according to a first example embodiment of the technology, with reference to FIGS. 2 to 4. The following processes to be executed by the vehicle control apparatus 1 may be executed in parallel by the respective control units included in the vehicle control apparatus 1.

Figure 2:
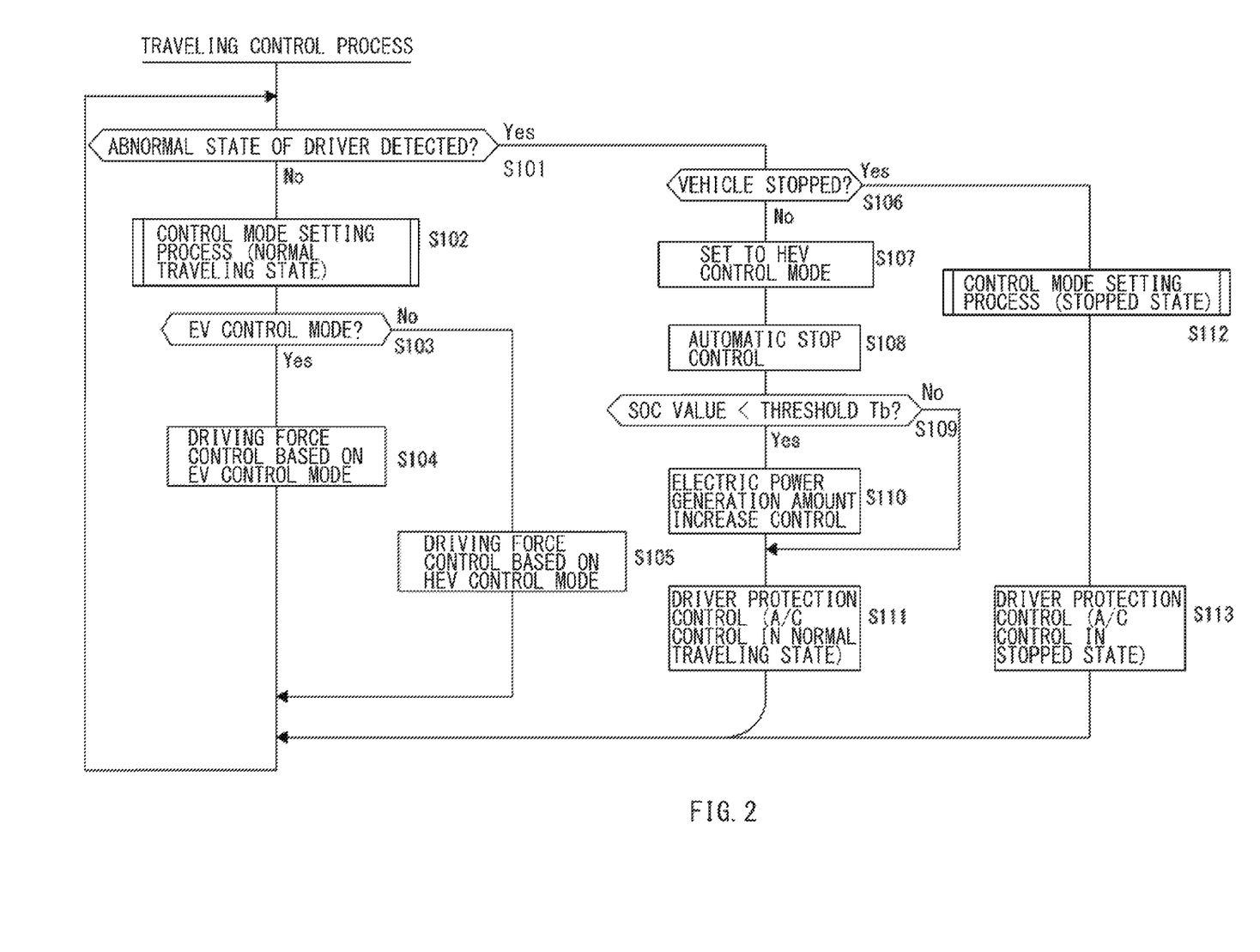
FIG. 2 is a flowchart illustrating an example of a process to be executed by a vehicle control apparatus according to one embodiment of the technology.

Referring to FIG. 2, first, the vehicle control apparatus 1 may determine whether the abnormal state of the driver has been detected in step S101. For example, the vehicle control apparatus 1 may acquire vehicle inside environment data from a device such as the vehicle inside environment sensor 92, and determine whether the driver is in the abnormal state on the basis of the acquired vehicle inside environment data.

As the vehicle inside environment data, the vehicle control apparatus 1 may acquire, for example: pulse data of the driver from the pulse sensor; body temperature data of the driver from the body temperature sensor; data related to expression or an attitude of the driver from the vehicle inside imaging sensor; audio data of the driver or any other audio data from the on-vehicle microphone; and the steering angle from the steering angle sensor.

The vehicle control apparatus 1 may determine that the driver is in the abnormal state, for example: in a case where the pulse or the body temperature of the driver is outside a preset normal range; in a case where the expression of the driver is determined as a suffering expression, etc. on the basis of an image analysis process performed on the acquired image data; in a case where the driver has an attitude of hunching over the steering wheel; and in a case where the driver is determined as being groaning or calling for help on the basis of an audio analysis process performed on the acquired audio data.

Further, the vehicle control apparatus 1 may execute a control such as a control of displaying a warning screen on any of the display units 61, or a control of outputting an audio such as a warning sound from the audio output unit 62, for example, in a case where a predetermined time elapses without any change in steering angle that is determinable as steering operation performed by the driver. Further, in a case where no steering operation by the driver is detected even with a lapse of a predetermined time from the display of the warning screen or the output of the warning sound, the vehicle control apparatus 1 may determine that the driver is in the abnormal state.

In a case where the vehicle control apparatus 1 determines that the driver is not in the abnormal state in step S101 (No in step S101), the vehicle control apparatus 1 may cause the process to proceed to step S102. In step S102, the vehicle control apparatus 1 may execute a control mode setting process for a case where the vehicle is in a normal traveling state.

Figure 3:
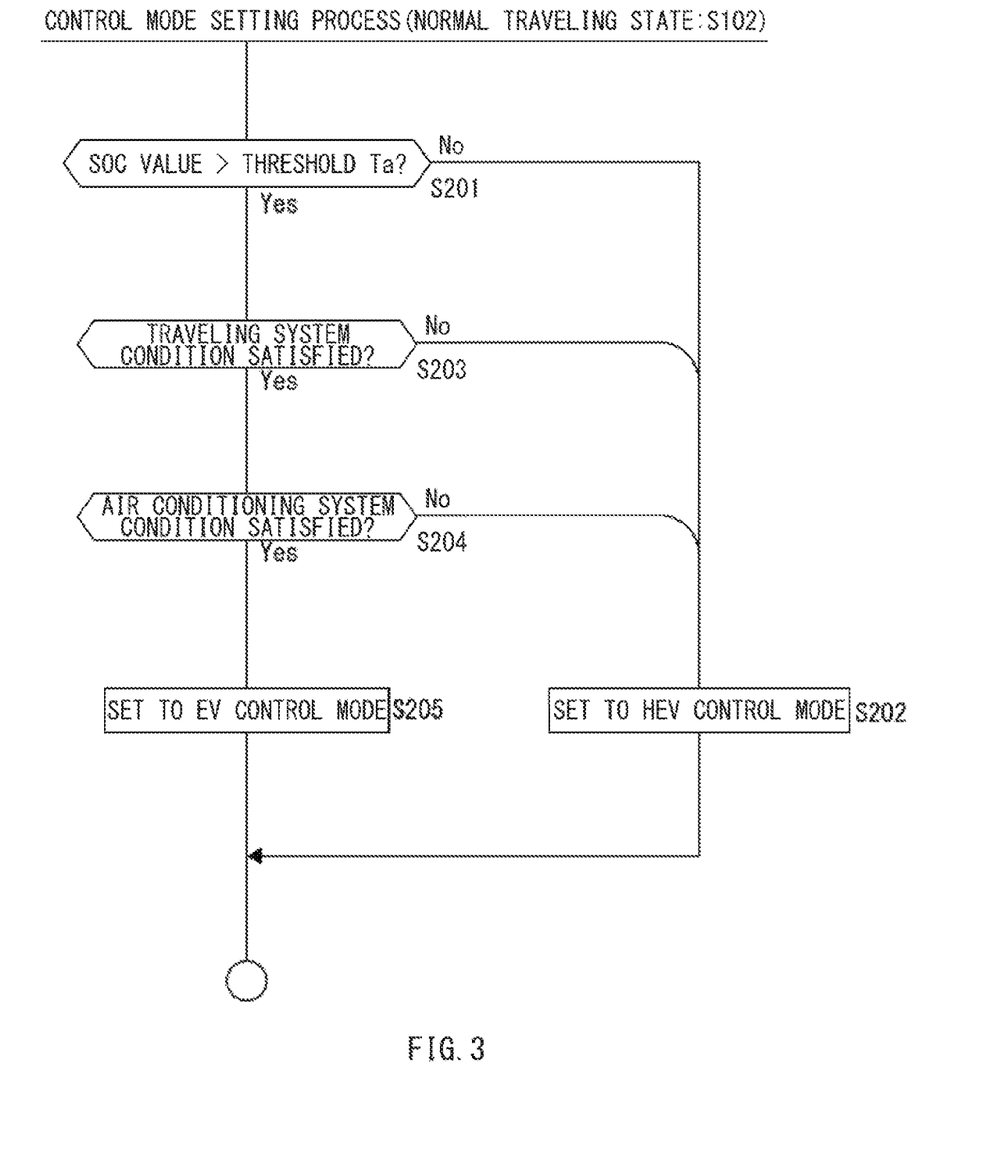
FIG. 3 is a flowchart illustrating an example of a process to be executed by the vehicle control apparatus according to one embodiment of the technology.

Referring to FIG. 3, a description is given next of the control mode setting process to be executed by the vehicle control apparatus 1 in the case where the vehicle is in the normal traveling state.

In step S201, the vehicle control apparatus 1 may determine whether the SOC value of the high-voltage battery is greater than a threshold Ta. The threshold Ta may be set, for example, as an SOC value of the high-voltage battery that may need to be secured to perform an operation control of the vehicle based on the motor in the EV control mode.

In a case where the SOC value of the high-voltage battery is not greater than the threshold Ta (i.e., in a case where the SOC value of the high-voltage battery is smaller than or equal to the threshold Ta) (No in step S201), the vehicle control apparatus 1 may cause the process to proceed to step S202. In step S202, the vehicle control apparatus 1 may set the operation control mode of the vehicle to the HEV control mode that allows for the engine driving control. Thereafter, the vehicle control apparatus 1 may bring the process illustrated in FIG. 3 to an end.

In a case where the SOC value of the high-voltage battery is greater than the threshold Ta (Yes in step 201), the vehicle control apparatus 1 may cause the process to proceed to step S203. In step S203, the vehicle control apparatus 1 may determine whether the traveling system condition of the vehicle is satisfied.

For example, the vehicle control apparatus 1 may determine whether engine driving is required in accordance with a satisfaction state of each condition based on a comparison between a detected value for the corresponding condition, such as the transmission oil temperature of the CVT or the engine water temperature, and a predetermined threshold set in advance.

In a case where it is determined that the engine driving is required (in a case where it is determined that the traveling system condition is not satisfied) (No in step S203), the vehicle control apparatus 1 may cause the process to proceed to step S202. In step S202, the vehicle control apparatus 1 may set the operation control mode of the vehicle to the HEV control mode. Thereafter, the vehicle control apparatus 1 may bring the process illustrated in FIG. 3 to the end.

In a case where it is determined that the engine driving is not required (in a case where it is determined that the traveling system condition is satisfied) (Yes in step S203), the vehicle control apparatus 1 may cause the process to proceed to step S204. In step S204, the vehicle control apparatus 1 may determine whether the air conditioning system condition is satisfied. For example, the vehicle control apparatus 1 may determine whether engine driving is required to perform the operation control of the air conditioner in accordance with a request from the air-conditioning control unit 8. The air-conditioning control unit 8 may make such a request, for example, upon a decrease in temperature of a radiator.

In a case where it is determined that the engine driving is required (in a case where it is determined that the air conditioning system condition is not satisfied) (No in step S204), the vehicle control apparatus 1 may cause the process to proceed to step S202. In step S202, the vehicle control apparatus 1 may set the operation control mode of the vehicle to the HEV control mode. Thereafter, the vehicle control apparatus 1 may bring the process illustrated in FIG. 3 to the end.

In a case where it is determined that the engine driving is not required (in a case where it is determined that the air conditioning system condition is satisfied) (Yes in step 204), the vehicle control apparatus 1 may cause the process to proceed to step S205. In step S205, the vehicle control apparatus 1 may set the operation control mode of the vehicle to the EV control mode. Thereafter, the vehicle control apparatus 1 may bring the process illustrated in FIG. 3 to the end.

After bringing the process illustrated in FIG. 3 to the end, the vehicle control apparatus 1 may cause the process to proceed to step S103 illustrated in FIG. 2. In step S103, the vehicle control apparatus 1 may determine whether the operation control mode of the vehicle is set to the EV control mode.

In a case where the operation control mode is set to the EV control mode (Yes in S103), the vehicle control apparatus 1 may cause the process to proceed to step S104. In step S104, the vehicle control apparatus 1 may execute various operation controls on the basis of the motor driving control while the control of the engine driving force is prohibited. Non-limiting examples of the various operation controls may include a traveling control of the vehicle and an idling stop system (ISS) control. Thereafter, the vehicle control apparatus 1 may cause the process to proceed to step S101, and execute processes similar to those described above.

In a case where the operation control mode is not set to the EV control mode (in a case where the operation control mode is set to the HEV control mode) (No in S103), the vehicle control apparatus 1 may cause the process to proceed to step S105. In step S105, the vehicle control apparatus 1 may execute various operation controls by controlling the motor and controlling also the engine on an as-needed basis. Non-limiting examples of the various operation controls may include the traveling control of the vehicle and a charging control of the high-voltage battery. Thereafter, the vehicle control apparatus 1 may cause the process to proceed to step S101, and execute processes similar to those described above.

In a case where it is determined that the driver is in the abnormal state in step S101 (Yes in step S101), the vehicle control apparatus 1 may cause the process to proceed to step S106. In step S106, the vehicle control apparatus 1 may determine whether the vehicle is in a stopped state.

In a case where it is determined that the vehicle is not in the stopped state (in a case where it is determined that the vehicle is in a traveling state) (No in step S106), the vehicle control apparatus 1 may cause the process to proceed to step S107. In step S107, the vehicle control apparatus 1 may set the operation control mode of the vehicle to the HEV control mode.

After setting the operation control mode to the HEV control mode, the vehicle control apparatus 1 may cause the process to proceed to step S108. In step S108, the vehicle control apparatus 1 may execute an automatic-driving control (an automatic stop control) to stop the vehicle. For example, the vehicle control apparatus 1 may control a unit such as the brake-related actuator 51 on the basis of the automatic stop control, to thereby decelerate the vehicle.

In a case where the automatic stop control is performed and the operation control mode is set to the HEV control mode, the vehicle control apparatus 1 may prohibit the operation control of the vehicle based on motor driving and execute only the operation control of the vehicle based on engine driving. This may allow the vehicle to perform traveling based on the engine driving in a period up to the stopping of the vehicle by the automatic stop control.

On this occasion, the vehicle control apparatus 1 may also perform the charging control of the high-voltage battery. This may secure the charge amount of the high-voltage battery for performing operation in step S111, such as the operation of the air conditioner, after the stopping of the vehicle by the automatic stop control performed in step S108. The automatic stop control in step S108 will be described later.

While the deceleration is performed by the automatic stop control, the vehicle control apparatus 1 may determine whether the SOC value of the high-voltage battery is smaller than a threshold Tb in step S109. The threshold Tb may be set, for example, as an SOC value of the high-voltage battery that may need to be secured to execute the operation of the air conditioner after the stopping of the vehicle.

The vehicle control apparatus 1 may use a preset value as the threshold Tb, or may variably set the threshold Tb on the basis of a comparison between a current vehicle inside temperature and the target temperature inside the vehicle after the stopping of the vehicle by the automatic stop control. For example, the vehicle control apparatus 1 may set the target temperature on the basis of, for example but not limited to, the body temperature of the driver, the vehicle inside temperature, and the vehicle outside temperature detected from the various sensors.

Herein, the target temperature inside the vehicle after the stopping of the vehicle may refer to the vehicle inside temperature which is set as a target after the stopping of the vehicle by the automatic-driving control. The target temperature may be set on the basis of, for example, the body temperature of the driver, the vehicle inside temperature, and the vehicle outside temperature. For example, the vehicle control apparatus 1 may set the target temperature to be higher, for example, in a case where the temperature such as the body temperature of the driver, the vehicle inside temperature, or the vehicle outside temperature is low. For example, the vehicle control apparatus 1 may set the target temperature to be lower, for example, in a case where the temperature such as the body temperature of the driver, the vehicle inside temperature, or the vehicle outside temperature is high.

In one example, the vehicle control apparatus 1 may set the target temperature on the basis of the position data of the vehicle. For example, the vehicle control apparatus 1 may acquire the position data of the vehicle from the GPS sensor. In a case where the acquired position data indicates a location where it may take a long time for another vehicle such as an emergency vehicle to arrive, the vehicle control apparatus 1 may set the threshold Tb to be higher in order to sufficiently secure the charge amount of the high-voltage battery.

In a case where the SOC value of the high-voltage battery is smaller than the threshold Tb (Yes in step S109), the vehicle control apparatus 1 may cause the process to proceed to step S110. In step S110, the vehicle control apparatus 1 may execute an electric power generation amount increase control process. In the electric power generation amount increase control process, the vehicle control apparatus 1 may control the amount of electric power generation for charging the high-voltage battery on the basis of a comparison between the current vehicle inside temperature and the target temperature after the stopping of the vehicle.

Figure 5:
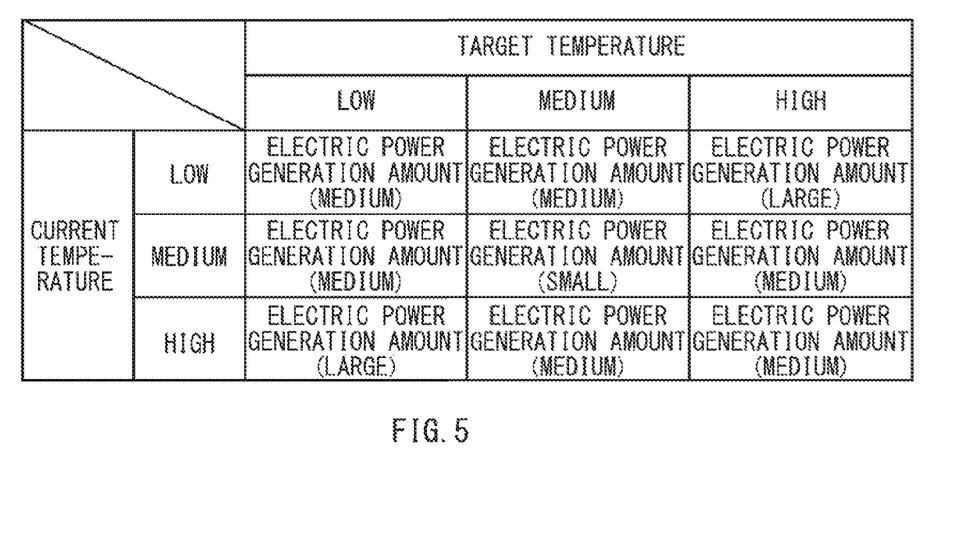
FIG. 5 is a diagram illustrating electric power generation amounts based on a difference between a target temperature and a current temperature according to one embodiment of the technology.

Referring now to FIG. 5, a description is given of the electric power generation amount to be controlled in accordance with a difference between the target temperature and the current vehicle inside temperature. The current vehicle inside temperature may be sometimes referred to as a "current temperature" in the following. In FIG. 5, as an example, three levels of "low", "medium", and "high" may be set for the current temperature and the target temperature, and the electric power generation amount for each case are described in three levels of "small", "medium", and "large".

For example, in a case where the current temperature is low and the target temperature is high, i.e. in a case where the difference between the current temperature and the target temperature is great, it may be assumed that the operation of the air conditioner is performed for a long time also after the stopping of the vehicle in order to heat inside the vehicle. Accordingly, the vehicle control apparatus 1 may so perform a control as to increase the amount of electric power generation for charging the high-voltage battery.

For example, in a case where the current temperature is low and the target temperature is low or medium, i.e. in a case where the difference between the current temperature and the target temperature is not great, the vehicle control apparatus 1 may so perform a control as to cause the amount of electric power generation for charging the high-voltage battery to be medium.

For example, in a case where the current temperature is medium and the target temperature is low or high, i.e. in a case where the difference between the current temperature and the target temperature is not great, the vehicle control apparatus 1 may so perform a control as to cause the amount of electric power generation for charging the high-voltage battery to be medium.

For example, in a case where the current temperature is medium and the target temperature is medium, i.e. in a case where there is little difference between the current temperature and the target temperature, the vehicle control apparatus 1 may so perform a control as to cause the amount of electric power generation for charging the high-voltage battery to be small.

For example, in a case where the current temperature is high and the target temperature is low, i.e. in a case where the difference between the current temperature and the target temperature is great, it may be assumed that the operation of the air conditioner is performed for a long time also after the stopping of the vehicle in order to cool inside the vehicle. Accordingly, the vehicle control apparatus 1 may so perform a control as to increase the amount of electric power generation for charging the high-voltage battery.

For example, in a case where the current temperature is high and the target temperature is medium or high, i.e. in a case where the difference between the current temperature and the target temperature is not great, the vehicle control apparatus 1 may so perform a control as to cause the amount of electric power generation for charging the high-voltage battery to be medium.

Note that, in one example, the vehicle control apparatus 1 may control the amount of electric power generation for charging the high-voltage battery not only on the basis of the difference between the target temperature and the current temperature but also on the basis of data such as the body temperature of the driver or the position data of the vehicle.

After the electric power generation amount increase control process in step S110, the vehicle control apparatus 1 may cause the process to proceed to step S111.

In a case where the SOC value of the high-voltage battery is not smaller than the threshold Tb (i.e., in a case where the SOC value of the high-voltage battery is greater than or equal to the threshold Tb) in step S109 (No in step S109), the vehicle control apparatus 1 may cause the process to proceed to step S111 without performing the electric power generation amount increase control process in step S110. A reason for this is that, if the SOC value of the high-voltage battery is greater than or equal to the threshold Tb, it is assumed that the charge amount of the high-voltage battery for performing the operation of the air conditioner after the stopping of the vehicle is allowed to be secured before the stopping of the vehicle.

In step S111, the vehicle control apparatus 1 may execute a driver protection control process while the automatic stop control is performed.

For example, the vehicle control apparatus 1 may execute the operation control of the air conditioner (A/C) while the automatic stop control is performed. On this occasion, the vehicle control apparatus 1 may so execute the operation control of the air conditioner that the vehicle inside temperature becomes as close as possible to the target temperature set on the basis of the data including, without limitation, the body temperature of the driver and the vehicle inside temperature. Note that, in one example, in order to reduce the frequency of the operation control based on the engine driving force after the stopping of the vehicle, the vehicle control apparatus 1 may so execute the operation control of the air conditioner that the vehicle inside temperature becomes higher than the target temperature.

The vehicle control apparatus 1 may also execute the operation control for charging of the high-voltage battery based on the engine driving while the operation control of the air conditioner is performed. The vehicle control apparatus 1 may so execute the operation control for charging the high-voltage battery that the SOC value of the high-voltage battery becomes greater than or equal to the threshold Tb.

After performing the process in step S111, the vehicle control apparatus 1 may cause the process to proceed to step S101, and execute processes similar to those described above.

Note that, in a case where the vehicle control apparatus 1 detects deactivation operation performed by the driver in step S101, the vehicle control apparatus 1 may determine that the driver has recovered from the abnormal state. In this case, the vehicle control apparatus 1 may cause the process to proceed to step S102. The deactivation operation may be operation that is determinable as being performed by the driver who has recovered from the abnormal state such as loss of consciousness. For example, such deactivation operation may be operation that has been determined as steering operation performed by the driver, on the basis of the variation amount of the steering angle acquired from the steering angle sensor.

In a case where the abnormal state of the driver is detected in step S101 (Yes in step S101) and where the stopping of the vehicle by the automatic stop control is determined in step S106 (Yes in step S106), the vehicle control apparatus 1 may cause the process to proceed to step S112. In step S112, the vehicle control apparatus 1 may execute a control mode setting process for a case where the vehicle is in the stopped state.

Figure 4:
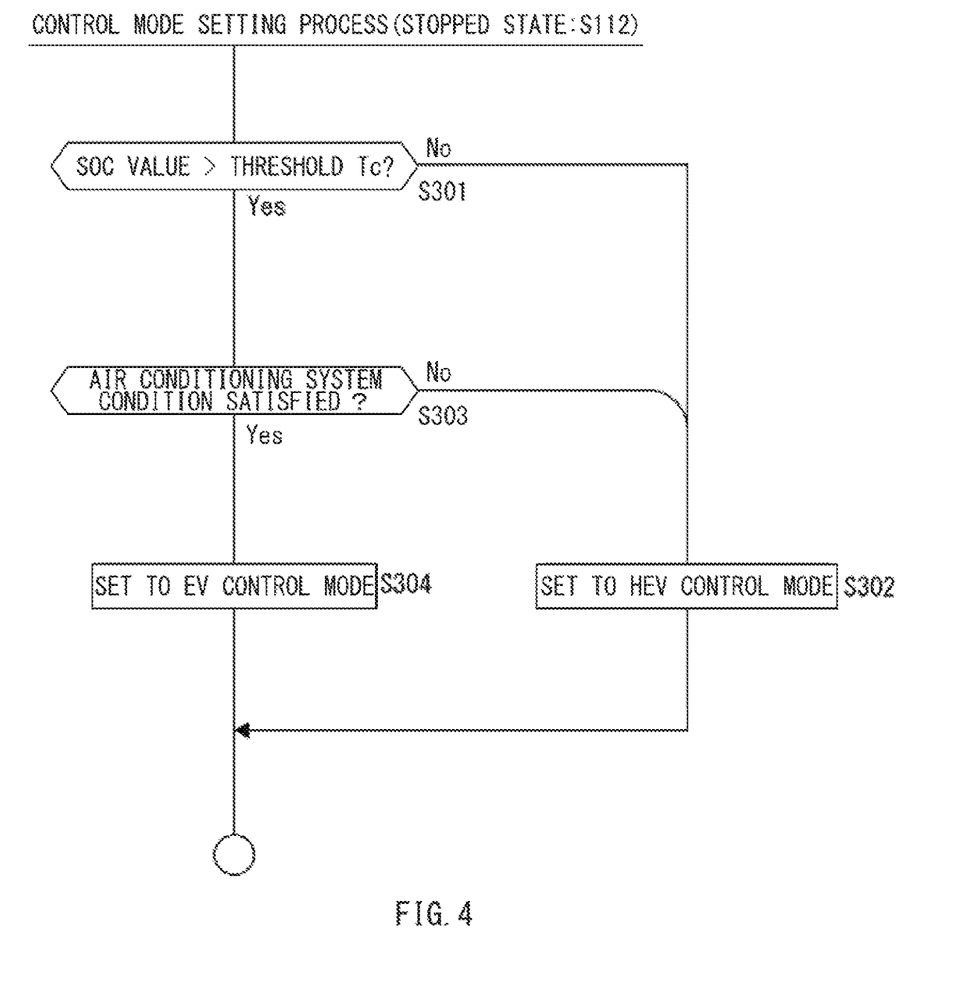
FIG. 4 is a flowchart illustrating an example of a process to be executed by the vehicle control apparatus according to one embodiment of the technology.

Referring now to FIG. 4, a description is given of the control mode setting process to be executed by the vehicle control apparatus 1 in the case where the vehicle is in the stopped state.

In step S301, the vehicle control apparatus 1 may determine whether the SOC value of the high-voltage battery is greater than a threshold Tc. The threshold Tc may be set, for example, as a value at which the charge rate of the high-voltage battery for performing the operation of the air conditioner is insufficient.

In a case where the SOC value of the high-voltage battery is not greater than the threshold Tc (in a case where the SOC value of the high-voltage battery is smaller than or equal to the threshold Tc) (No in step S301), the vehicle control apparatus 1 may cause the process to proceed to step S302. In step S302, the vehicle control apparatus 1 may set the operation control mode of the vehicle to the HEV control mode that allows for the engine driving control. Further, the vehicle control apparatus 1 may execute the charging process of the high voltage battery based on engine driving until the SOC value of the high-voltage battery becomes greater than the threshold Tc.

In the HEV control mode after the stopping of the vehicle by the automatic stop control, the vehicle control apparatus 1 may execute the operation control of the vehicle mainly based on engine driving. In one example, the vehicle control apparatus 1 may cause substantially no motor driving to be performed or may exceptionally cause the motor driving to be performed in a case where a predetermined condition is satisfied on this occasion.

After performing the process in step S302, the vehicle control apparatus 1 may bring the process illustrated in FIG. 4 to an end.

Regarding the threshold of the SOC value of the high-voltage battery for causing the operation control mode of the vehicle to be set to the HEV control mode, the threshold Tc in the traveling control mode in a case where the vehicle is in the stopped state may be smaller than the threshold Ta in the traveling control mode in a case where the vehicle is in the normal traveling state. This may be to reduce occasions to charge the high-voltage battery by means of the engine driving control as much as possible, in order to decrease the possibility that an occupant such as the driver inside the vehicle suffers carbon monoxide poisoning due to a cause such as backflow of an exhaust gas.

In a case where the SOC value of the high-voltage battery is greater than the threshold Tc (Yes in step S301), the vehicle control apparatus 1 may cause the process to proceed to step S303. In step S303, the vehicle control apparatus 1 may determine whether the air conditioning system condition is satisfied (whether engine driving is required for the operation of the air conditioner).

In a case where it is determined that the air conditioning system condition is not satisfied (No in step S303), the vehicle control apparatus 1 may cause the process to proceed to step S302. In step S302, the vehicle control apparatus 1 may set the operation control mode of the vehicle to the HEV control mode. Thereafter, the vehicle control apparatus 1 may bring the process illustrated in FIG. 4 to an end.

In a case where it is determined that the air conditioning system condition is satisfied (Yes in step S303), the vehicle control apparatus 1 may cause the process to proceed to step S304. In step S304, the vehicle control apparatus 1 may set the operation control mode of the vehicle to the EV control mode. Thereafter, the vehicle control apparatus 1 may bring the process illustrated FIG. 4 to the end.

After bringing the process illustrated FIG. 4 to the end, the vehicle control apparatus 1 may cause the process to proceed to step S113 illustrated in FIG. 2. In step S113, the vehicle control apparatus 1 may execute the driver protection control process after the stopping of the vehicle by the automatic stop control.

For example, in a case where the operation control mode is set to the EV control mode, the vehicle control apparatus 1 may execute the operation control of the air conditioner with use of the electric power of the high-voltage battery until the vehicle inside temperature reaches the target temperature.

In a case where the operation control mode is set to the HEV control mode, the vehicle control apparatus 1 may execute the operation control of the air conditioner with use of the electric power of the high-voltage battery until the vehicle inside temperature reaches the target temperature, while performing the charging control of the high-voltage battery in accordance with engine driving.

Note that the vehicle control apparatus 1 may so execute the operation control that the operation level of the air conditioner after the stopping of the vehicle in step S113 is lower than the operation level of the air conditioner in a case where the automatic stop control is performed in step S111. Further, the vehicle control apparatus 1 may so execute the operation control that the operation level of the air conditioner in the case where the automatic stop control is performed in step S111 is lower than the operation level of the air conditioner in the case where the vehicle is in the normal traveling state in steps S104 and S105.

Herein, the term "operation level of the air conditioner" may refer to a degree of operation for adjusting, for example, a blowing amount and a blowing temperature in the vehicle. For example, the wording "the operation level is high" may refer to execution of the operation control for causing the vehicle inside temperature to reach the target temperature in a shorter time.

The vehicle control apparatus 1 may so perform the operation control as to cause the operation level of the air conditioner to be higher in order to cause the vehicle inside temperature to be as close as possible to the target temperature while the automatic stop control is performed. After the stopping of the vehicle, the vehicle control apparatus 1 may so perform the operation control as to cause the operation level of the air conditioner to be lower in order to reduce occasions to execute engine driving accompanying the charging of the high-voltage battery as much as possible.

After performing the process in step S113, the vehicle control apparatus 1 may cause the process to proceed to step S101, and execute processes similar to those described above.

Note that, in a case where the vehicle control apparatus 1 detects the deactivation operation performed by the driver in step S101, the vehicle control apparatus 1 may determine that the driver has recovered from the abnormal state. In this case, the vehicle control apparatus 1 may cause the process to proceed to step S102. The deactivation operation described above may be performed by the driver, recovered from the abnormal state, operating an operation device provided in the vehicle, for example.

The first example embodiment may be implemented by the processes of the vehicle control apparatus 1 described above.

A description is given of examples of processes to be executed by the vehicle control apparatus 1 according to a second example embodiment of the technology, with reference to FIGS. 2 to 6. The following describes the control mode setting process (step S112 in FIG. 2) in a case where the vehicle is in the stopped state while the automatic stop control is performed, which is different from the process according to the first example embodiment.

Figure 6:
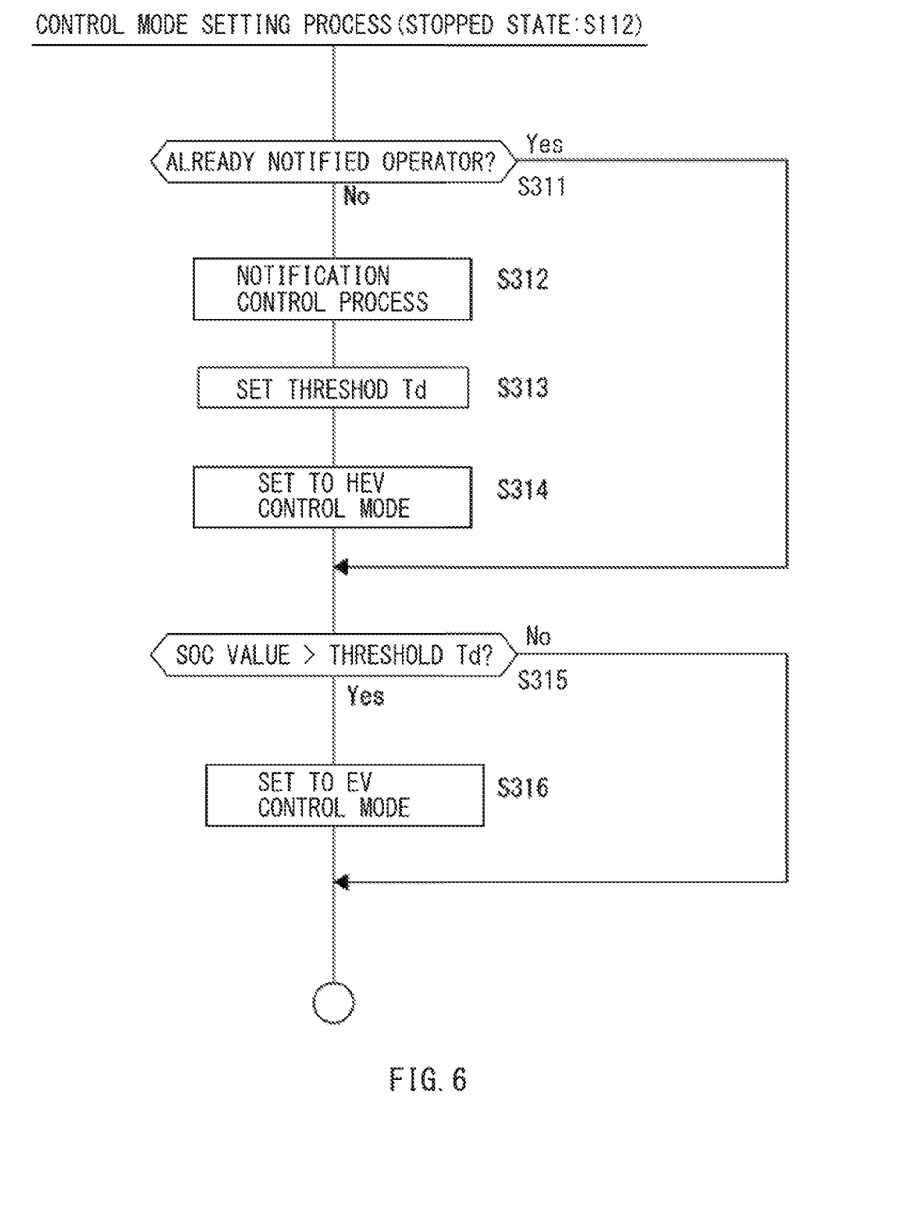
FIG. 6 is a flowchart illustrating an example of a process to be executed by a vehicle control apparatus according to one embodiment of the technology.

First, in a case where the vehicle control apparatus 1 determines the stopping of the vehicle by the automatic stop control in step S106 illustrated in FIG. 2 (Yes in step S106), the vehicle control apparatus 1 may cause the process to proceed to step S311 illustrated in FIG. 6. In step S311, the vehicle control apparatus 1 may determine whether a notification control process has been executed. The notification control process may be a process of transmitting an emergency vehicle call notification, which requests an emergency vehicle, to the external apparatus on the operator side. For example, the operator may make arrangements for the emergency vehicle.

In a case where the notification control process has not been executed (No in step S311), the vehicle control apparatus 1 may cause the process to proceed to step S312. In step S312, the vehicle control apparatus 1 may execute the notification control process of notifying the external apparatus on the operator side of a request for an emergency vehicle.

Thereafter, in step S313, the vehicle control apparatus 1 may set a threshold Td. The vehicle control apparatus 1 may set, as the threshold Td, the SOC value of the high-voltage battery required to execute, for example, the operation of the air conditioner in a period up to the arrival of the emergency vehicle.

The time required for the arrival of the emergency vehicle may be set in advance as an estimated time, or may be set on the basis of time data for the arrival of the emergency vehicle acquired from the external apparatus on the operator side. In one example, the estimated time for the arrival of the emergency vehicle may be calculated on the basis of the position data of the stopped vehicle.

In step S314, the vehicle control apparatus 1 may set the operation control mode to the HEV control mode, and execute the charging control of the high-voltage battery based on engine driving until the SOC value of the high-voltage battery becomes greater than the threshold Td. In the HEV control mode after the stopping of the vehicle by the automatic stop control, the vehicle control apparatus 1 may execute the operation control of the vehicle mainly based on engine driving. In one example, the vehicle control apparatus 1 may cause substantially no motor driving to be performed or may exceptionally cause the motor driving to be performed in a case where a predetermined condition is satisfied on this occasion.

In step S315, the vehicle control apparatus 1 may determine whether the SOC value of the high-voltage battery is greater than the threshold Td.

In a case where the SOC value of the high-voltage battery is greater than the threshold Td (Yes in S315), the vehicle control apparatus 1 may cause the process to proceed to step S316. In step S316, the vehicle control apparatus 1 may set the operation control mode to the EV control mode. Thus setting the operation control mode to the EV control mode may prohibit engine driving.

After performing the process in step S316, the vehicle control apparatus 1 may bring the process illustrated in FIG. 6 to an end.

In a case where the SOC value of the high-voltage battery is not greater than the threshold Td (in a case where the SOC value of the high-voltage battery is smaller than or equal to the threshold Td) (No in S315), the vehicle control apparatus 1 may keep the operation control mode to the HEV control mode and bring the process illustrated in FIG. 6 to the end.

The vehicle control apparatus 1 according to the example embodiment of the technology includes an automatic-driving processor (the driving-assist control unit 9) and an engine processor (the hybrid control unit 4). The automatic-driving processor (the driving-assist control unit 9) is configured to perform an automatic-driving control of stopping a vehicle in accordance with detection of an abnormal state of a driver while the vehicle is traveling. The engine processor (the hybrid control unit 4) is configured to perform an engine driving control to reduce an engine driving frequency of the vehicle in a case where the vehicle is in a standby state after stopping of the vehicle by the automatic-driving control compared with an engine driving frequency of the vehicle in a case where the vehicle is in a normal traveling state. The standby state is a state in which an operation control of an air conditioner of the vehicle is allowed (see steps S301 to S304 illustrated in FIG. 4, etc).

Herein, the engine driving frequency may refer to how frequently the engine is started. That is, in a case where the vehicle is stopped in accordance with the detection of the abnormal state, it may be sometimes unavoidable to start the engine depending on the charging state after the stopping of the vehicle. However, the occasions to start the engine are to be reduced as much as possible.

Accordingly, the occasions to start the engine are reduced as much as possible upon performing the operation of the air conditioner after the stopping of the vehicle by the automatic-driving control. For example, in an environment where the stopped vehicle is covered with accumulated snow, this makes it possible to reduce occurrence of a second disaster such as carbon monoxide poisoning of an occupant such as the driver resulting from backflow of the exhaust gas due to the engine driving with the blocked exhaust port of the vehicle, while preventing a situation causing hypothermia of an occupant such as the driver by heating the inside of the vehicle by means of the operation of the air conditioner.

According to the example embodiment, it is thus possible to minimize engine driving for the operation of the air conditioner after the stopping of the vehicle by the automatic-driving control.

For example, according to the example embodiment, the HEV control mode may be set on the basis of the satisfaction states of the three conditions as illustrated in FIG. 3 in the case where the vehicle is in the normal traveling state. After the stopping of the vehicle by the automatic-driving control, the HEV control mode may be set on the basis of the satisfaction states of the two conditions excluding the traveling system condition, as illustrated in FIG. 4. Further, the threshold of the SOC value of the high-voltage battery for setting the HEV control mode may be set to be higher after the stopping of the vehicle by the automatic-driving control than in the case where the vehicle is in the normal traveling state (Ta<Tc). This helps to reduce the engine driving frequency. The number of satisfaction conditions, the degree of each of the satisfaction conditions, and the range of each of the satisfaction condition may be set to be different between the case where the vehicle is in the normal traveling state and the case after the stopping of the vehicle by the automatic stop control as described above. The vehicle control apparatus 1 may thereby so execute the operation control of the vehicle that the engine driving frequency is lower after the stopping of the vehicle by the automatic stop control than in the case where the vehicle is in the normal traveling state.

Regarding the vehicle control apparatus 1 according to the example embodiment, the vehicle may be a hybrid electric vehicle including a motor and an engine that are each coupled to a drive wheel. The engine processor (the hybrid control unit 4) may cause the vehicle to travel by engine driving force in a period up to the stopping of the vehicle by the automatic-driving control performed by the automatic-driving processor (the driving-assist control unit 9) (see steps S108 to S111 illustrated in FIG. 2, etc).

That is, in the automatic-driving control based on the abnormal state of the driver, the traveling based on the motor or the ISS function may be prohibited, and a control may be so executed that the traveling based on the engine is performed in order to charge the battery until the vehicle is stopped.

This helps to secure, in a period up to the stopping of the vehicle, the charge amount of the battery to be used for the operation of the air conditioner after the stopping of the vehicle. Therefore, it is possible to reduce the occasions that require engine driving after the stopping of the vehicle. Accordingly, it is possible to reduce the possibility of causing a situation such as carbon monoxide poisoning.

The vehicle control apparatus 1 according to the example embodiment may control an amount of electric power generation for battery charging on the basis of a comparison between a current vehicle inside temperature of the vehicle and a target temperature inside the vehicle after the stopping of the vehicle, in a period up to the stopping of the vehicle by the automatic-driving control performed by the automatic-driving processor (the driving-assist control unit 9) (see steps S109 and S110 illustrated in FIG. 2, etc).

With this configuration, the battery charge amount to be used for the operation of the air conditioner after the stopping of the vehicle may be estimated from the target temperature of the inside of the vehicle. The control of the electric power generation amount may be so executed as to secure the estimated battery charge amount while the vehicle is traveling.

Accordingly, securing the battery charge amount as much as possible while the vehicle is traveling makes it possible to further reduce the occasions to execute the engine driving for charging the battery, thereby reducing the possibility of causing a situation such as carbon monoxide poisoning.

The vehicle control apparatus 1 according to the example embodiment may further include an air-conditioning processor (the driving-assist control unit 9). The air-conditioning processor (the driving-assist control unit 9) may perform the operation control of the air conditioner to cause an operation level of the air conditioner to be a requested operation level based on a difference between the target temperature and the current vehicle inside temperature. The air-conditioning processor (the driving-assist control unit 9) may set the operation level of the air conditioner to be higher than the requested operation level in the period up to the stopping of the vehicle by the automatic-driving control performed by the automatic-driving processor (the driving-assist control unit 9) (see steps S111 and S113 illustrated in FIG. 2, etc).

With this configuration, the vehicle inside temperature may become closer to the target temperature while the vehicle is traveling. Therefore, it is possible to reduce the operation of the air conditioner after the stopping of the vehicle by the automatic-driving control, thereby reducing electric power consumption of the battery.

Accordingly, it is possible to further reduce the occasions to execute the engine driving control for charging the battery after the stopping of the vehicle. It is therefore possible to reduce the possibility of causing a situation such as carbon monoxide poisoning.

In the vehicle control apparatus 1 according to the example embodiment, the automatic-driving processor (the driving-assist control unit 9) may perform a process of transmitting a call notification for an emergency vehicle after the stopping of the vehicle by the automatic-driving control. The engine processor (the hybrid control unit 4) may cause battery charging by engine driving force to be executed until a battery charge amount required for a period up to arrival of the emergency vehicle is secured after the stopping of the vehicle by the automatic-driving control (see steps S311 to S315 illustrated in FIG. 6, etc).

With this configuration, the battery charge amount for the operation of the air conditioner may be secured in a period up to the arrival of the emergency vehicle at the location where the vehicle is stopped.

Accordingly, it is possible to adjust the vehicle inside temperature by means of the operation of the air conditioner in the period up to the arrival of the emergency vehicle at the location where the vehicle is stopped. This helps to prevent a second disaster such as hypothermia or dehydration of an occupant such as the driver present inside the vehicle after the stopping of the vehicle. Moreover, the engine driving may be stopped after securing the necessary battery charge amount in the period up to the arrival of the emergency vehicle at the location where the vehicle is stopped. This makes it possible to reduce the possibility of causing a situation such as carbon monoxide poisoning.

According to the example embodiment, a description has been given with reference to a hybrid electric vehicle as an example of the vehicle; however, this is non-limiting. One embodiment of the technology may be applicable to various vehicles as long as the vehicle includes an engine as a power source for driving wheels. For example, the vehicle control apparatus of the vehicle may execute, during the automatic stop control: an air conditioning control to allow the vehicle inside temperature to reach the target temperature; and a charging control of a 12-volt battery used for the operation of the air conditioner. Further, for example, the vehicle control apparatus of the vehicle may control the engine drive in accordance with the charging state of the 12-volt battery after stopping of the vehicle. This may implement one embodiment of the technology.

Moreover, according to the example embodiment, a description has been given with reference to the charging control of the high-voltage battery in the hybrid electric vehicle as an example; however, this is non-limiting. The battery according to one embodiment of the technology may be any battery that supplies electric power to be used for the operation of the air conditioner. For example, one embodiment of the technology may be similarly applicable to a 12-volt battery that supplies electric power to a fuel pump, a fuel injection device, and an ignition device upon starting the engine, or that supplies electric power to an electric component such as lamps.

According to the example embodiment, the recovery of the driver from the abnormal state may be determined on the basis of the presence or the absence of the operation performed on a device such as the operation device of the vehicle; however, this is non-limiting. In one example embodiment, the vehicle control apparatus 1 may determine whether the driver has recovered from the abnormal state on the basis of a result of determination of the state of the driver based on the vehicle inside environment data.

Moreover, according to the example embodiment, the target temperature may be related to the vehicle inside temperature; however, this is non-limiting. In one example embodiment, the target temperature may be related to the body temperature of the driver.

Note that the term "GPS" used in the example embodiments described above does not limitedly refer to the "global positioning system" operated by the US, but also encompasses a "global navigation satellite system (GNSS)" which is a general satellite positioning system.

Note that the effects described in the disclosure are merely illustrative and non-limiting. Any other effect may be achieved, or part of the effects described in the disclosure may be achieved.

Although some embodiments of the technology have been described in the foregoing by way of example, the technology is by no means limited to the embodiments described above. It should be appreciated that modifications and alterations may be made in accordance with a factor such as a design without departing from the technical idea of the embodiment of the technology, other than the example embodiments described above. Further, it may not be necessary to provide all of the combination of the configurations described above in the example embodiments to solve an issue.

Figure 1:
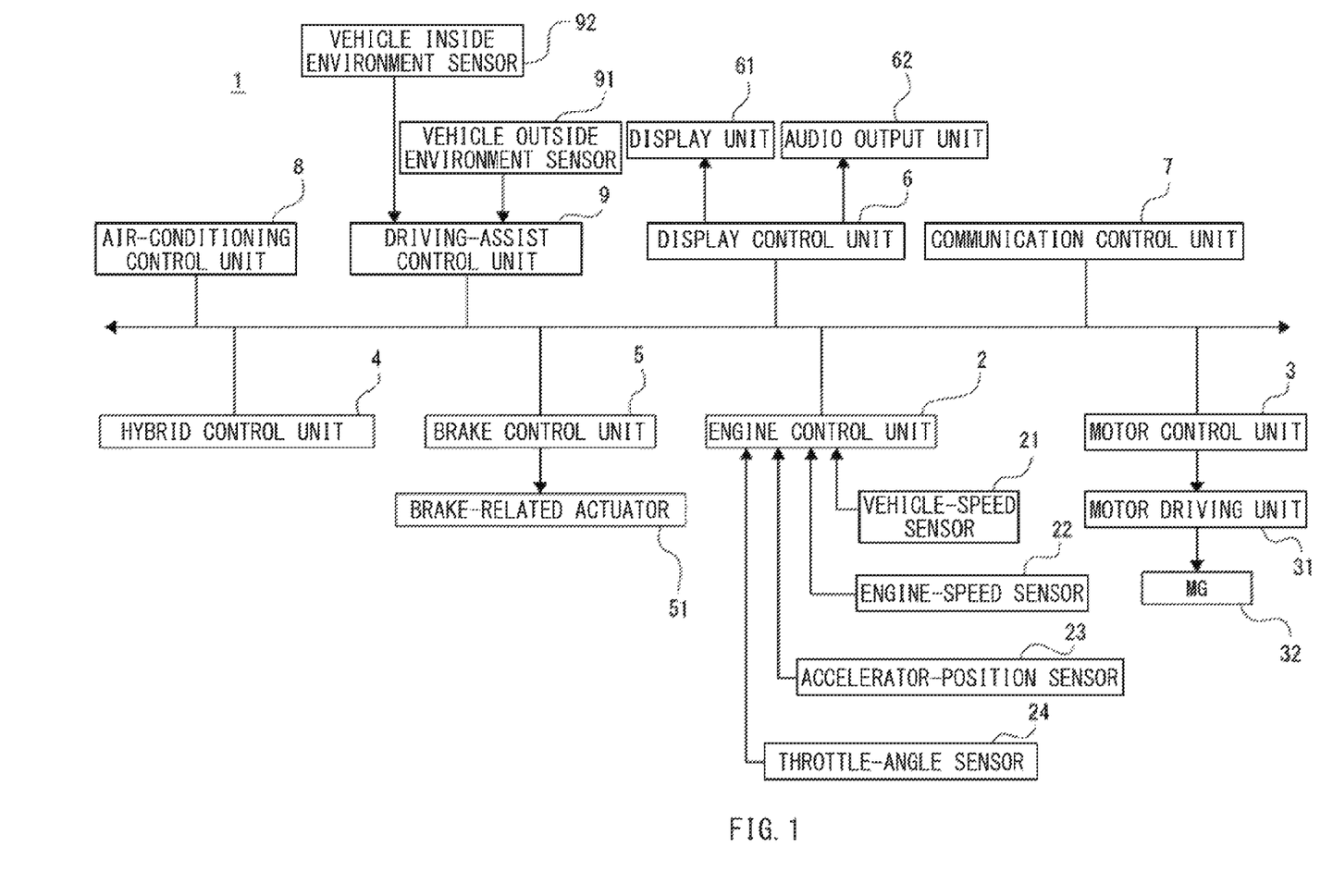
FIG. 1 is a block diagram illustrating an example of a configuration of a vehicle control apparatus according to one embodiment of the technology.

Each of the engine control unit 2, the motor control unit 3, the hybrid control unit 4, the brake control unit 5, the display control unit 6, the communication control unit 7, the air-conditioning control unit 8, and the driving-assist control unit 9 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the engine control unit 2, the motor control unit 3, the hybrid control unit 4, the brake control unit 5, the display control unit 6, the communication control unit 7, the air-conditioning control unit 8, and the driving-assist control unit 9 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the engine control unit 2, the motor control unit 3, the hybrid control unit 4, the brake control unit 5, the display control unit 6, the communication control unit 7, the air-conditioning control unit 8, and the driving-assist control unit 9 illustrated in FIG. 1.

The invention claimed is:
1. A vehicle control apparatus comprising:
an automatic-driving processor configured to perform an automatic-driving control to stop a vehicle in accordance with detection of an abnormal state of a driver who drives the vehicle while the vehicle is traveling, the abnormal state being one of (i) an unconscious state of the driver, (ii) a non-concentrating state of the driver, or (iii) a driver absent state of the driver; and an engine processor configured to, when the vehicle is in a standby state after stopping of the vehicle by the automatic-driving control, perform an engine driving control to reduce how frequently an engine of the vehicle is started, compared with when the vehicle is in a normal traveling state, the normal traveling state being when the abnormal state of the driver is not detected, the standby state being a state in which an operation control of an air conditioner of the vehicle is allowed, wherein the vehicle comprises a hybrid electric vehicle including a motor, and the engine and the motor are each coupled to a drive wheel, and the engine processor is configured to cause the vehicle to travel by driving force of the engine in a period up to the stopping of the vehicle by the automatic-driving control performed by the automatic-driving processor.

2. The vehicle control apparatus according to claim 1, wherein the vehicle control apparatus is configured to control an amount of electric power generation for battery charging on a basis of a comparison between a current vehicle inside temperature of the vehicle and a target temperature inside the vehicle after the stopping of the vehicle, in the period up to the stopping of the vehicle by the automatic-driving control performed by the automatic-driving processor.

3. A vehicle control apparatus comprising:
an automatic-driving processor configured to perform an automatic-driving control to stop a vehicle in accordance with detection of an abnormal state of a driver who drives the vehicle while the vehicle is traveling, the abnormal state being one of (i) an unconscious state of the driver, (ii) a non-concentrating state of the driver, or (iii) a driver absent state of the driver; and an engine processor configured to, when the vehicle is in a standby state after stopping of the vehicle by the automatic-driving control, perform an engine driving control to reduce how frequently an engine of the vehicle is started, compared with when the vehicle is in a normal traveling state, the normal traveling state being when the abnormal state of the driver is not detected, the standby state being a state in which an operation control of an air conditioner of the vehicle is allowed, wherein the vehicle control apparatus is configured to control an amount of electric power generation for battery charging on a basis of a comparison between a current vehicle inside temperature of the vehicle and a target temperature inside the vehicle after the stopping of the vehicle, in a period up to the stopping of the vehicle by the automatic-driving control performed by the automatic-driving processor, and the vehicle control apparatus further comprises an air-conditioning processor configured to perform the operation control of the air conditioner to cause an operation level of the air conditioner to be a requested operation level based on a difference between the target temperature and the current vehicle inside temperature, wherein the air-conditioning processor is configured to set the operation level of the air conditioner to be higher than the requested operation level in the period up to the stopping of the vehicle by the automatic-driving control performed by the automatic-driving processor.

4. The vehicle control apparatus according to claim 2, further comprising:
an air-conditioning processor configured to perform the operation control of the air conditioner to cause an operation level of the air conditioner to be a requested operation level based on a difference between the target temperature and the current vehicle inside temperature, wherein the air-conditioning processor is configured to set the operation level of the air conditioner to be higher than the requested operation level in the period up to the stopping of the vehicle by the automatic-driving control performed by the automatic-driving processor.

5. The vehicle control apparatus according to claim 1, wherein
the automatic-driving processor is configured to perform a process of transmitting a call notification for an emergency vehicle after the stopping of the vehicle by the automatic-driving control, and the engine processor is configured to cause battery charging by engine driving force to be executed until a battery charge amount required for a period up to arrival of the emergency vehicle is secured after the stopping of the vehicle by the automatic-driving control.

6. The vehicle control apparatus according to claim 2, wherein
the automatic-driving processor is configured to perform a process of transmitting a call notification for an emergency vehicle after the stopping of the vehicle by the automatic-driving control, and the engine processor is configured to cause battery charging by engine driving force to be executed until a battery charge amount required for a period up to arrival of the emergency vehicle is secured after the stopping of the vehicle by the automatic-driving control.

7. The vehicle control apparatus according to claim 3, wherein
the automatic-driving processor is configured to perform a process of transmitting a call notification for an emergency vehicle after the stopping of the vehicle by the automatic-driving control, and the engine processor is configured to cause battery charging by engine driving force to be executed until a battery charge amount required for a period up to arrival of the emergency vehicle is secured after the stopping of the vehicle by the automatic-driving control.

8. The vehicle control apparatus according to claim 4, wherein
the automatic-driving processor is configured to perform a process of transmitting a call notification for an emergency vehicle after the stopping of the vehicle by the automatic-driving control, and the engine processor is configured to cause battery charging by engine driving force to be executed until a battery charge amount required for a period up to arrival of the emergency vehicle is secured after the stopping of the vehicle by the automatic-driving control.

9. A vehicle control apparatus comprising:
circuitry configured to
perform an automatic-driving control to stop a vehicle in accordance with detection of an abnormal state of a driver who drives the vehicle while the vehicle is traveling, the abnormal state being one of (i) an unconscious state of the driver, (ii) a non-concentrating state of the driver, or (iii) a driver absent state of the driver, and when the vehicle is in a standby state after stopping of the vehicle by the automatic-driving control, perform an engine driving control to reduce how frequently an engine of the vehicle is started, compared with when the vehicle is in a normal traveling state, the normal traveling state being when the abnormal state of the driver is not detected, the standby state being a state in which an operation control of an air conditioner of the vehicle is allowed, wherein the vehicle comprises a hybrid electric vehicle including a motor, and the engine and the motor are each coupled to a drive wheel, and the circuitry is configured to cause the vehicle to travel by driving force of the engine in a period up to the stopping of the vehicle by the automatic-driving control.

10. The vehicle control apparatus according to claim 9, wherein the circuitry is further configured to perform the operation control of the air conditioner to cause an operation level of the air conditioner to be a requested operation level based on a difference between a target temperature and a current vehicle inside temperature, and set the operation level of the air conditioner to be higher than the requested operation level in a period up to the stopping of the vehicle by the automatic-driving control.

\* \* \* \* \*